G. D. ORR.
ACCESSORY FOR AUTOMOBILES.
APPLICATION FILED FEB. 16, 1921.
1,423,730.
Patented July 25, 1922.
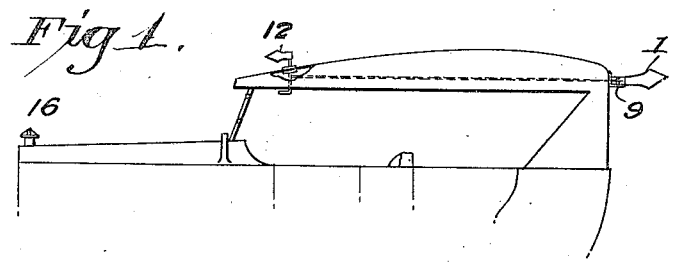
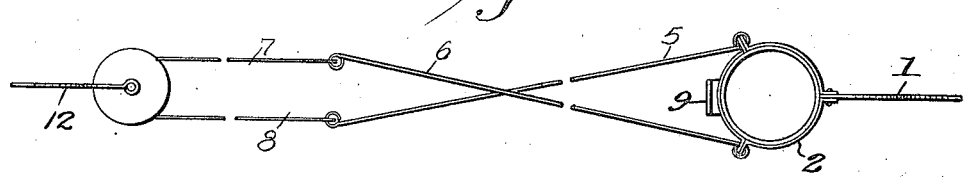
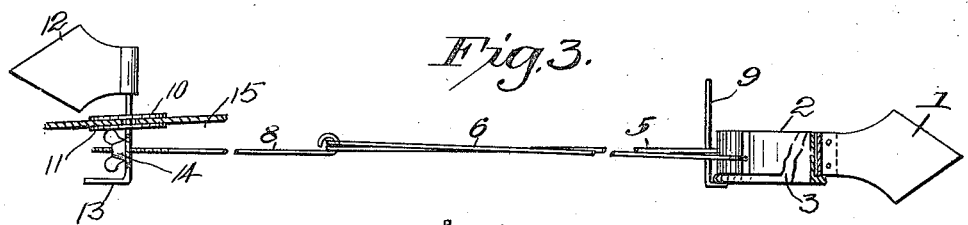
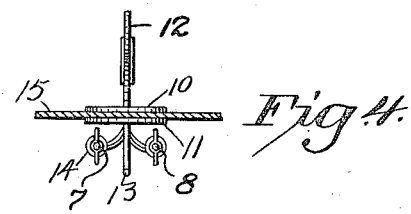
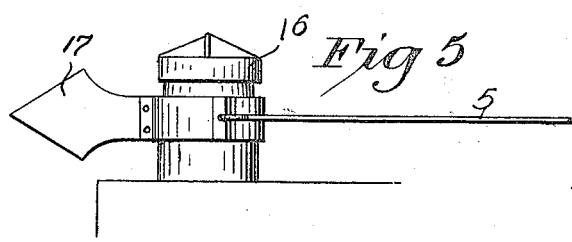
Inventor:
George D. Orr.

UNITED STATES PATENT OFFICE.

GEORGE D. ORR, OF CINCINNATI, OHIO.

ACCESSORY FOR AUTOMOBILES.

1,423,730.  Specification of Letters Patent.  Patented July 25, 1922.

Application filed February 16, 1921. Serial No. 445,554.

*To all whom it may concern:*

Be it known that I, GEORGE D. ORR, a citizen of the United States, residing at Cincinnati, in the county of Hamilton and State of Ohio, have invented a new and useful Accessory for Automobiles (that will indicate the direction the driver wishes to go).

Fig. 1, is side elevation showing my device applied to an automobile.

Fig. 2, is a plan view of the signals and their operating mechanism.

Fig. 3, is a side view of the same.

Fig. 4, is a detail view of the front signal.

Fig. 5, is a similar view of a modification.

*Detailed description.*

Small figures indicate same parts in all views.

Figs. 1 and 12 are back pointer respectively and front pointer on center, top, cover, of automobile.

Fig. 2. 1—12, are back and front pointers, joined together by the wires 5, 6, 7, 8, connecting the back and front parts, which turn together.

Fig. 3. 1, is pointer fastened to collar 2 set on shelf 9, at center of back top cover, of automobile. Wires 5, 6 Fig. 2, enter under automobile top cover, lying close up to top until they join wires 7, 8, which then are joined at 14, 14 to front part. The crossed wires 5, 8, and 6, 7, cause the pointers 1 and 12 to turn at the same time, to right or left by pressing the thumb and finger on 14, 14, Fig. 3 and Fig. 4 while the driver by a glance at 13 can see, or feel, in the dark, by the way 13 points how the pointer 12 is directed, and the back pointer 1 is controlled from 14, 14, at same instant.

10 is the top flange, 11 bottom flange, 12 front indicator, 13 wire bent to front and then upright, and on which the parts fit as follows: 11 lower flange, then through, vehicle cover 15, top flange 10, indicator 12. Wire 13 is then bent in V shape, so as to bind 12 to point same way as 13 Fig. 3 and Fig. 4.

14—14 ends of back control wires at front which are shown in Fig. 3 and Fig. 4 may be either screws or simply bent to hold to front part as shown in Fig. 4. 3 indicates that the collar is made of light metal.

Fig. 4. 13 is a wire bent to shape two loops and a pointer also upright, on which fit in order, 11 lower flange, 15 vehicle cover, 10 top flange, 12 front indicator; 13 is then bent as shown in Fig. 3.

In Fig. 5 the device is shown applied to a radiator cap 16; 17 being the pointer while wires 5 and 6 lead back to small holes under windshield, where they are bent to keep from slipping.

While I have shown and described the preferred embodiment of my invention, it will be understood that minor changes in construction, combination and arrangements of parts may be made without departing from the spirit and scope of the invention as claimed.

Having thus described my invention what I claim is.

An automobile indicator comprising front and rear pointers rotatably mounted upon the top of the vehicle, the front pointer being mounted upon a wire extending down through the top and bent forwardly to form an operating handle, said wire having laterally extending ears to which are attached rearwardly extending rods, said rods being connected to the rear pointer by means of crossed wires, whereby the two pointers are caused to move in unison.

To which I affix my signature.

GEORGE D. ORR.